United States Patent [19]

Kilgore et al.

[11] Patent Number: 4,710,665

[45] Date of Patent: Dec. 1, 1987

[54] HOMOPOLAR DYNAMOELECTRIC MACHINE WITH SELF-COMPENSATING CURRENT COLLECTOR

[75] Inventors: Lee A. Kilgore, Export, Pa.; Bobby D. McKee, San Jose, Calif.

[73] Assignee: Westinghouse Electric Corp., Pittsburgh, Pa.

[21] Appl. No.: 912,733

[22] Filed: Sep. 29, 1986

[51] Int. Cl.[4] .......................................... H02K 13/00
[52] U.S. Cl. .................................. 310/219; 310/178; 310/239; 310/248; 310/259
[58] Field of Search ............... 310/178, 239, 219, 242, 310/232, 165, 254, 259, 256, 261, 248, 249, 102 A; 322/48, 54; 336/84 M; 339/1 R; 318/361, 541

[56] References Cited

U.S. PATENT DOCUMENTS

| 2,230,131 | 1/1941 | Chandeysson | 310/178 |
| 3,539,852 | 11/1970 | Appleton et al. | 310/178 |
| 3,590,295 | 6/1971 | Appleton et al. | 310/178 |
| 4,503,349 | 3/1985 | Miller | 310/178 |
| 4,581,555 | 4/1986 | Kuznetsov et al. | 310/178 |
| 4,602,179 | 7/1986 | Kuznetsov et al. | 310/219 |

FOREIGN PATENT DOCUMENTS

| 2107937 | 5/1983 | United Kingdom | 310/178 |
| 0828333 | 5/1981 | U.S.S.R. | 310/178 |
| 1019545 | 5/1983 | U.S.S.R. | 310/178 |

Primary Examiner—R. Skudy
Attorney, Agent, or Firm—R. P. Lenart

[57] ABSTRACT

A homopolar dynamoelectric machine is provided with current collecting structures which produce a peripheral, circumferential component of load current for self-excitation. The current collection structures include brush boxes which are skewed at a first angle with respect to the rotor axis and a generally cylindrical stator conductor having slits which are skewed at a second angle with respect to the rotor axis. Current flowing in the brushes and stator conductor is forced to have a circumferential component which compensates for rotor saturation due to load current and minimizes the voltage droop characteristic of drum-type homopolar generators.

4 Claims, 5 Drawing Figures

HOMOPOLAR DYNAMOELECTRIC MACHINE WITH SELF-COMPENSATING CURRENT COLLECTOR

STATEMENT OF GOVERNMENT INTEREST

The United States Government has rights in this invention pursuant to Contract No. FO08635-84-C-0331 awarded by the Department of Defense.

BACKGROUND OF THE INVENTION

This invention relates to dynamoelectric machines and more particularly to drum-type homopolar machines.

Drum-type homopolar dynamoelectric machines include a stationary excitation system and a rotating drum composed of a combination of ferromagnetic and highly conductive materials configured such that a direct current output voltage is produced along the axial length of the drum. These machines incorporate a set of current collection members at either axial end of the rotor, which carries the full load current. Homopolar dynamoelectric machines may operate as either a motor or generator and are particularly suited to transfer energy in short, high current pulses to a storage inductor and a final load consisting of a resistive-inductive system. The rotor of drum-type homopolar machines may include a cylindrical shell of a highly conductive, non-ferromagnetic material which generates and supports the full load current. This member is bonded or shrunk onto a ferromagnetic inner cylindrical core which serves as the main rotor body and is directly attached to a drive or input shaft. Both components of the rotor are, preferably, homogeneous materials without segmentation or any combination of axial or circumferential grooves. Since modern current collectors may operate at a current density of about 10 or fifteen kiloamps per square inch, it is imperative that the rotor surface on the two axial ends be smooth since this surface is used exclusively for current collection with, for example, solid metal-graphite brushes. The machine's internal electromotive force is confined to an axial zone along the center of the rotor between the two outer current collection zones.

The excitation system of drum-type homopolar machines includes a stator having a main pole piece which is used to confine the magnetic flux to a zone of the rotor which is directly in line radially with the main pole piece. It is desirable that the total machine flux should only cut the rotor surface at a location which is separated from the current collecting zone. In practical machines, with significant iron-iron air gaps, magnetic saturation of the core material or poles and conventional pole tip geometries, an amount of leakage flux will typically pass from the main pole side across the air gap at a non-radial angle and enter the rotor magnetic circuit through the current collection zone. It is this leakage flux which causes an additional voltage to be generated in the rotor zone under the brushes. The particular construction of a rotor shell which includes a continuous homogeneous cylinder in conjunction with the use of a relatively long brush collector at each end creates an additional induced electromotive force due to the leakage flux that results in large continuous circulating current in closed, short circulating loops composed of the rotor conductor and each brush box at every point in the current collection zone of the rotor.

In the design of drum-type conventional homopolar machines, corrective measures have been implemented to reduce the severity of the stray magnetic field not directly forming in the active air gap area. Certain techniques for improving machine reliability, although not performance, reduce the thermal stress associated with higher than average brush-to-rotor circulating currents and the consequent, sometimes unpredictable, temperature rises. Some of the techniques used for reducing stray air gap magnetic fields are as follows:

1. Keeping the collector length as small as possible by increasing the collector current density;
2. Increasing the rotor diameter of the machine with a significant decrease in rotor collector length;
3. Changing the radial thickness of the conductor rotor shell between the active zone and the current collection zone so that the active zone contains the rotor shell segment with the least amount of non-ferromagnetic material;
4. Using a solid ferromagnetic rotor without a conductive shell, but plating the rotor core in the current collection zone with a highly conductive material so as to maintain a minimum air gap in the active region;
5. Shielding the current collection system with a non-ferromagnetic, highly electrically conductive enclosure, necessitating that surface eddy currents provide screening of those applications which are strictly of a time transient or pulsed operation;
6. Extending the null-flux zone of the current collection area, by adding a necessary axial length to the stator frame which usually results in large unutilized air spaces in the machine;
7. Diverting leakage flux adjacent to the main excitation coil by adding a shield to that coil; and
8. Adding an auxiliary coil adjacent to a side of the brushes which is opposite to the brush side facing the main excitation coil.

Other methods which do not generally decrease the stray magnetic field but tend to lessen the possibility of heavy circulating currents include;

1. Attaching each current collection module to separate load circuits for extending the lead length of individual brush modules so as to increase the effective resistance of the circulating current path; and
2. Modifying the rotor to increase the effective rotor surface axial resistance path for circulating currents above the resistance encountered for currents flowing in a singularly radial direction.

All of the above methods of reducing radial flux in the current collection region impose either size, weight, perforamnce or cost burdens on the machine.

When a load is applied to a drum-type homopolar generator, the load current flows initially along the surface of the rotor. The current then begins to penetrate into the rotor at a certain rate. As the current penetrates, the magnetic field induced by the load current saturates the rotor surface where the current has penetrated. This saturation is seen by the field excitation as an increase in air gap which increases the leakage field. This air gap increase also causes an output voltage droop which will reduce the output current. For a typical pulse operation, voltage is already dropping as the rotor rpm slows and the output capability of the machine can be significantly reduced. It is therefore desirable to have a homopolar dynamoelectric machine which includes structures which not only reduce leakage flux in the current collection region but also compensate for the reduction in output current caused by the apparent air gap increase.

SUMMARY OF THE INVENTION

Homopolar dynamoelectric machines constructed in accordance with the present invention include structures which collect the load current in such a way as to produce a peripheral, circumferential ampere-turn component. This component compensates for the load current saturation of the rotor. The machines of the present invention include a rotor having a central axis and being mounted for relative rotation within a stator structure forming a flux path with a main pole piece positioned to direct flux radially into a first portion of the rotor. An excitation coil is provided to produce magnetic flux in the flux path. Current collecting assemblies which are capable of making sliding electrical contact with a current collection zone of the rotor are connected to one end of a generally cylindrical stator conductor. The other end of the stator conductor is connected to the load and the stator conductor is provided with a plurality of slits which are skewed with respect to the rotor axis in a circumferential direction so that current flowing in the stator conductor between the slits has a circumferential component which adds flux to the magnetic flux produced by the field coil. The current collection assembly may include a plurality of generally rectangular brush assemblies which are also skewed with respect to the rotor axis in a circumferential direction, so that current flowing in the brush assemblies has a circumferential component which also adds flux to the magnetic flux produced by the field coil.

The self-compensating current collection design of the present invention will compensate for increased ampere turns required by the saturation of the rotor surface due to load current, without the use of sophisticated and expensive external field excitation. The present invention also minimizes the voltage droop characteristic of ferromagnetic drum-type homopolar generators.

DESCRIPTION OF THE PREFERRED EMBODIMENT

Figure 1:
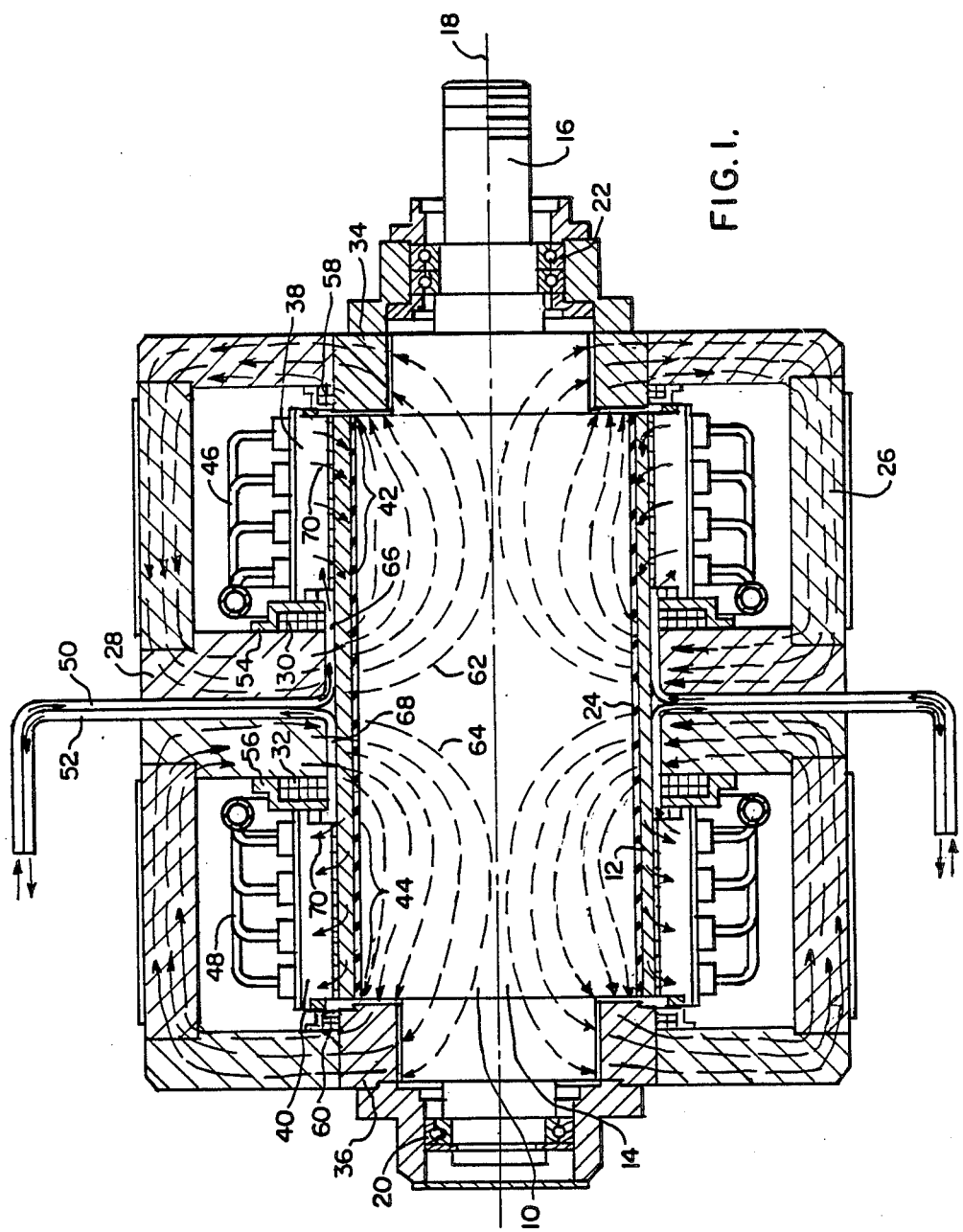
FIG. 1 is a cross-section of a homopolar dynamoelectric machine constructed in accordance with one embodiment of the present invention.

Referring to the drawings, FIG. 1 is an axial cross-section of a homopolar dynamoelectric machine constructed in accordance with one embodiment of the present invention. This machine includes a rotor 10 having a cylindrical shell 12 of a highly conductive, nonferromagnetic material which is bonded or shrunk onto a ferromagnetic inner cylindrical core 14 that serves as the main rotor body and is directly attached to a drive or input shaft 16. The rotor is mounted for rotation about a central axis 18 by way of bearings 20 and 22. Insulation 24 is positioned between the shell 12 and core 14. The stator structure 26 includes a main pole piece 28 which is positioned to direct magnetic flux produced by current flowing in excitation coils 30 and 32 radially into a central portion of the rotor. The stator 26 also includes end pole pieces 34 and 36 which are positioned adjacent to each end of the rotor to direct magnetic flux axially through the adjacent rotor ends.

A plurality of current collecting brush assemblies, which include assemblies 38 and 40, are spaced around the machine periphery adjacent to the rotor surface to minimize brush current density for a given total output current. Large homopolar machines may have in excess of 40 brush boxes per side, spaced at intervals of less than 10 degrees. The brush assemblies are mounted to make sliding electrical contact with the current collection zones 42 and 44 of the rotor and may be disengaged from the rotor surface by conventional brush lifting mechanisms 46 and 48. Such mechanisms are usually pneumatically operated with all brush actuators connected in parallel to provide for simultaneous dropping or lowering of all brushes with equal pressure and response time. Insulated conductors 50 and 52 connect brush assemblies 38 and 40, respectively, to an external circuit. Magnetic flux shields 54 and 56 are positioned adjacent to excitation coils 30 and 32 to divert leakage flux from the main field coils of the machine into paths as close as possible to the main magnetic path, thereby minimizing electromagnetic interactions in the current collection zone.

The machine of FIG. 1 also includes auxiliary excitation coils 58 and 60 which serve to minimize radial components of the magnetic flux in the current collection zones. The magntic flux paths 62 and 64 of this machine are seen to pass radially into the central portion of the rotor adjacent to the main pole piece 28 and to pass axially through the ends of the rotor into the stator end pole pieces 34 and 36. Conductors 50 and 52 are connected to brush assemblies 38 and 40 by way of cylindrical conductors 66 and 68 which are positioned between the main pole piece 28 and the rotor surface. As the rotor rotates, it cuts lines of flux in the main flux paths 62 and 64 thereby inducing current shown as solid arrows 70 in the conductive shell of the rotor. This current is transferred to the load circuit by conductors 50 and 52 when brush assemblies 38 and 40 are lowered to make sliding electrical contact with the current collection zones 42 and 44 of the rotor.

Figure 2:
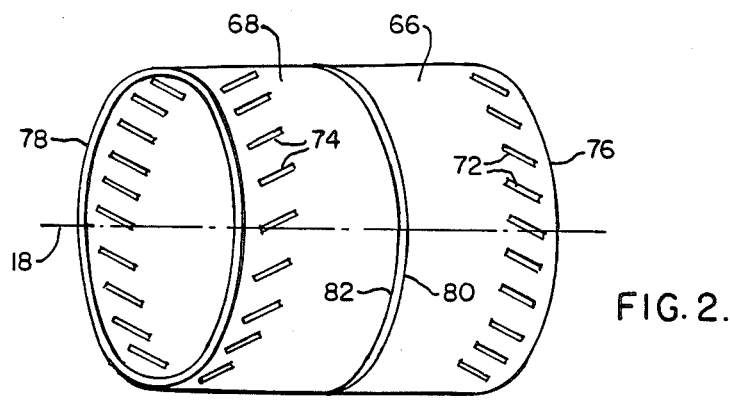
FIG. 2 is an isometric view of the cylindrical stator conductors of the machine of FIG. 1.
Figure 3:
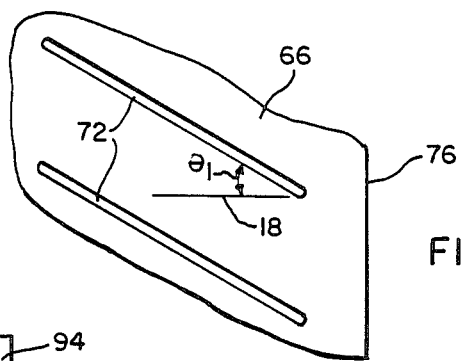
FIG. 3 is an enlarged view of the slits in the stator conductor of FIG. 2.

FIG. 2 is an isometric view of the generally cylindrical stator conductors 66 and 68 of the machine of FIG. 1. Conductor 66 is seen to include a plurality of slits 72 which are skewed with respect to the central rotor axis 18. Similarly, conductor 68 is seen to include a plurality of slits 74 which are also skewed, but at an opposite angle, with respect to axis 18. In the machine of FIG. 1, brush assembly 38 is connected to a first end 76 of generally cylindrical stator conductor 66. Similarly, brush assembly 40 is connected to a first end 78 of generally cylindrical stator conductor 68. Therefore, current collected by brush assembly 38 passes form end 76 of conductor 66 to end 80 and is forced to have a circumferential component as it passes between slits 72. This same effect occurs as current collected by brush assembly 40 passes from a first end 78 to a second end 82 of conductor 68, as it passes between slits 74. As shown in FIG. 3, slits 72 are inclined in a circumferential direction at an angle $\theta_1$ with respect to the rotor axis 18. Therefore, current flowing in the conductor 66 between these slits will have a circumferential component which is approximately equal to the magnitude of the current multiplied by the sine of $\theta_1$. The circumferential current component adds magnetic flux to the adjacent flux path, thereby providing a degree of self-excitation which reduces output voltage drop during pulsed operation. The angle $\theta_1$ should be chosen such that the integrated circumferential component of load current should match the additional ampere-turns required by the saturation of the rotor surface. Furthermore, the axial distribution of the circumferential component of load current should approximate the distribution of the additonal required ampere turns along the rotor surface. This requirement is achieved through the use of skewed brush boxes.

Figure 5:
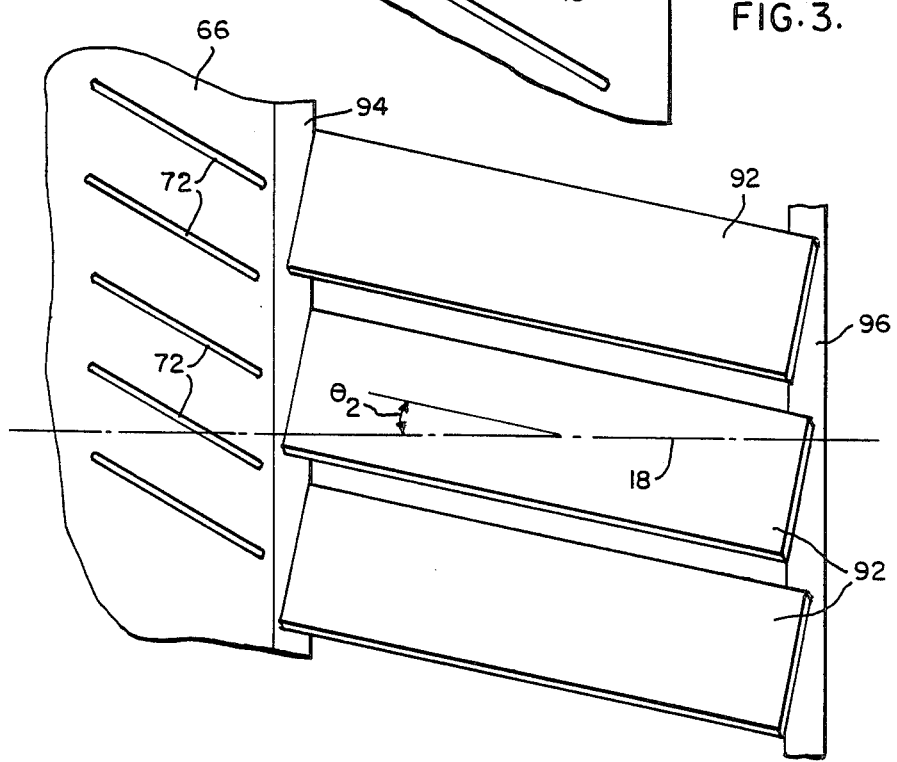
FIG. 5 is a schematic representation of several brush boxes and one stator conductor of the machine of FIG. 1.
Figure 4:
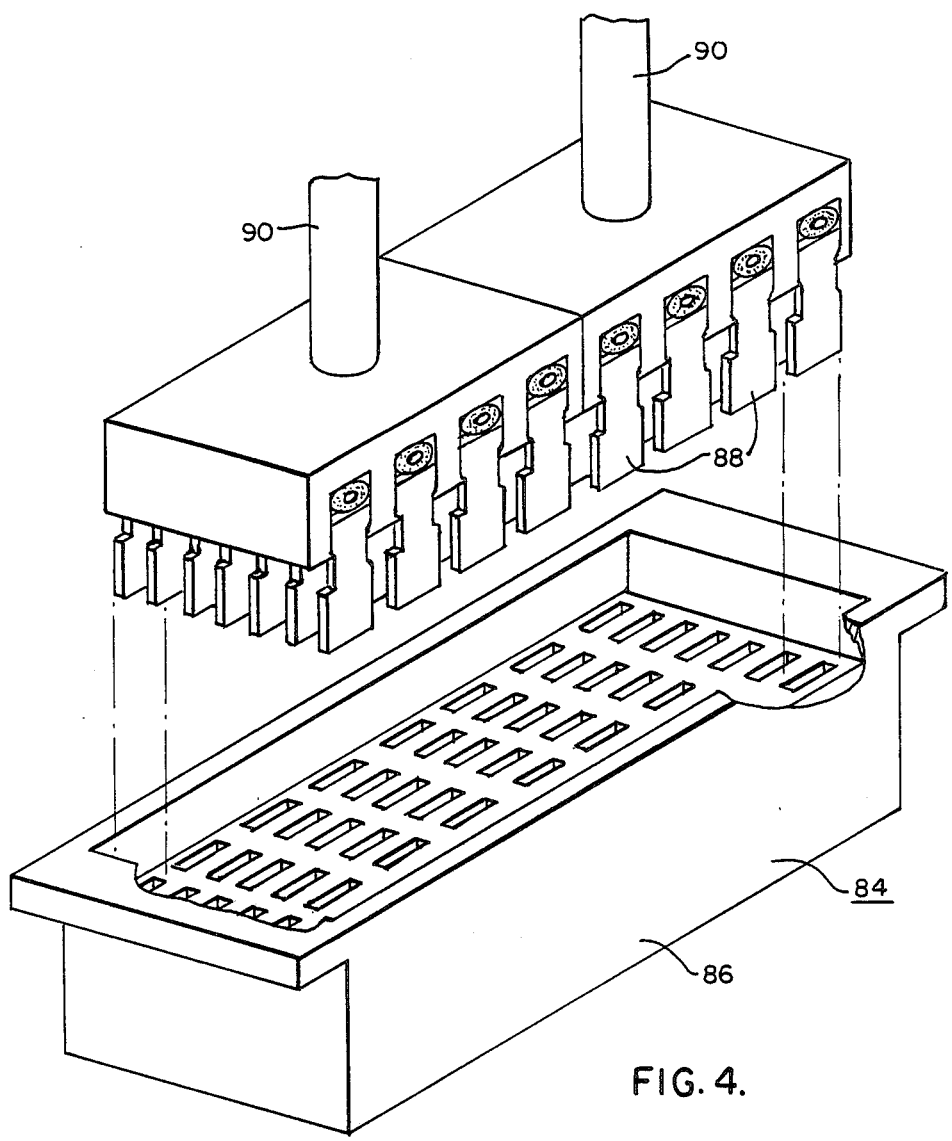
FIG. 4 is an isometric view of a brush assembly which may be used in the machine of FIG. 1.

FIG. 4 is an isometric view of a current collecting brush assembly 84 which may be used in the machine of FIG. 1. This assembly includes a generally cylindrical brush box 86 which houses a plurality of brushes 88 arranged in a generally cylindrical array. Actuating rod 90 is used to raise and lower the brush elements. FIG. 5 is a schematic representation of a plurality of brush boxes 92 which are inclined at an angle $\theta_2$ with respect to the rotor axis 18 and are mounted between a pair of conductive mounting rings 94 and 96. Ring 94 electrically connects the brush boxes to the first end of stator conductor 66. A second set of brush boxes, also inclined at an angle with respect to the rotor axis, are electrically connected to a first end of stator conductor 68. Calculations indicate that for a 10 megajoule machine having a 1.5 million amp, 50 volt output at 14,000 rpm, stator conductor slits having an angle of 25 degrees and a length of 3.25 inches and skewed brush boxes at an angle of 10 degrees will reduce circulating currents in the current collection region to tolerable levels and nearly eliminate voltage droop during an output current pulse.

Although the present invention has been described in terms of what is at present believed to be its preferred embodiment, it will be apparent to those skilled in the art that various changes may be made without departing from the scope of the invention. It is therefore intended that the appended claims cover such changes.

What is claimed is:

1. A dynamoelectric machine comprising:
a stator structure;
a rotor having a central axis, being positioned within said stator structure and being mounted for rotation with respect to said stator structure;
said stator structure having a flux path with a pole piece mounted to direct flux radially into a first portion of said rotor;
an excitation coil for producing magnetic flux in said flux path;
a generally cylindrical stator conductor positioned around said rotor to form an annular gap between said rotor and said stator conductor;
a current collecting means capable of making electrical contact with a second portion of said rotor and connected to conduct current from said rotor to one end of said stator conductor; and
a plurality of slits in said stator conductor, said slits being skewed at a preselected angle with respect to the rotor axis in a circumferential direction, so that current flowing in said stator conductor between said slits has a circumferential component which adds flux to the magnetic flux produced by said excitation coil;

wherein said current collecting means includes a plurality of generally rectangular brush assemblies, each of said generally rectangular brush assemblies being inclined at a second angle with respect to said rotor axis in a circumferential direction, so that current flowing in said assemblies has a circumferential component which adds flux to the magnetic flux produced by said excitation coil.

2. A dynamoelectric machine comprising:
a stator structure;
a ferromagnetic rotor having a central axis, being positioned within said stator structure and being mounted for rotation with respect to said stator structure;
said stator structure having two flux paths and a pole piece mounted to direct flux radially into a first portion of said rotor;
an excitation coil for producing magnetic flux in said flux paths;
a first generally cylindrical stator conductor positioned around said rotor to form a first annular gap between said rotor and said first generally cylindrical stator conductor;
a first current collecting means capable of making electrical contact with a second portion of said rotor and connected to conduct current from said rotor to one end of said first generally cylindrical stator conductor;
a first plurality of slits in said first generally cylindrical stator conductor, said first plurality of slits being skewed at a first angle with respect to the rotor axis in a circumferential direction, so that current flowing in said first generally cylindrical stator conductor between said first plurality of slits has a circumferential component which adds flux to the magnetic flux produced by said excitation coil in a first one of said flux paths;
a second generally cylindrical stator conductor positioned around said rotor to form a second annular gap between said rotor and said second generally cylindrical stator conductor;
a second current collecting means capable of making electrical contact with a third portion of said rotor and connected to conduct current from said rotor to one end of said second generally cylindrical stator conductor; and
a second plurality of slits in said second generally cylindrical stator conductor, said second plurality of slits being skewed at a second preselected angle with respect to said rotor axis in a circumferential direction, so that current flowing in said second generally cylindrical stator conductor between said second plurality of slits has a circumferential component which adds flux to the magnetic flux produced by said excitation coil in a second one of said flux paths.

3. A dynamoelectric machine as recited in claim 2, wherein said first current collecting means comprises:
a first plurality of generally rectangular brush assemblies, each of said first plurality of generally rectangular brush assemblies being inclined with respect to said rotor axis in a circumferential direction, so that current flowing in each of said first plurality of generally rectangular brush assemblies has a circumferential component which adds flux to the magnetic flux produced in said first flux path by said excitation coil; and wherein said second current collecting means comprises a second plurality of generally rectangular brush assemblies, each of said second plurality of generally rectangular brush assemblies being inclined with respect to said rotor axis in a circumferential direction, so that current flowing in each of said second plurality of generally rectangular brush assemblies has a circumferential component which adds flux to the magnetic flux produced in said second flux path by said excitation coil.

4. A dynamoelectric machine as recited in claim 2, wherein the direction of skew of said first plurality of slits is opposite to the direction of skew of said second plurality of slits.

* * * * *